US012427595B2

(12) United States Patent
Livingston et al.

(10) Patent No.: US 12,427,595 B2
(45) Date of Patent: Sep. 30, 2025

(54) SOLDERING TOOL WITH ORIENTATION SAFETY CONTROL

(71) Applicant: VIS, LLC, Travelers Rest, SC (US)

(72) Inventors: Patrick Livingston, Travelers Rest, SC (US); Eric Inman, Travelers Rest, SC (US); Jason Huguet, Travelers Rest, SC (US); Chris Danner, Travelers Rest, SC (US)

(73) Assignee: VIS, LLC, Travelers Rest, SC (US)

( * ) Notice: Subject to any disclaimer, the term of this patent is extended or adjusted under 35 U.S.C. 154(b) by 324 days.

(21) Appl. No.: 18/200,405

(22) Filed: May 22, 2023

(65) Prior Publication Data

US 2024/0139848 A1    May 2, 2024

Related U.S. Application Data

(60) Provisional application No. 63/419,555, filed on Oct. 26, 2022.

(51) Int. Cl.
*B23K 3/03*    (2006.01)

(52) U.S. Cl.
CPC .......... *B23K 3/0323* (2013.01); *B23K 3/0353* (2013.01)

(58) Field of Classification Search
CPC .... B23K 3/0323; B23K 3/0353; B23K 3/033; B23K 3/0338
USPC ................ 126/401, 414, 226–230, 236–241, 126/229–235
See application file for complete search history.

(56) References Cited

U.S. PATENT DOCUMENTS

| | | |
|---|---|---|
| D404,006 S | 1/1999 | Clowers et al. |
| 7,157,882 B2 | 1/2007 | Johnson et al. |
| 7,157,883 B2 | 1/2007 | Johnson et al. |
| 7,164,257 B2 | 1/2007 | Johnson et al. |
| 7,176,654 B2 | 2/2007 | Meyer et al. |
| 7,253,585 B2 | 8/2007 | Johnson et al. |
| 7,262,580 B2 | 8/2007 | Meyer et al. |
| 7,273,159 B2 | 9/2007 | Brotto |
| 7,321,219 B2 | 1/2008 | Meyer et al. |
| 7,323,847 B2 | 1/2008 | Meyer et al. |
| 7,342,381 B2 | 3/2008 | Johnson et al. |
| 7,425,816 B2 | 9/2008 | Meyer et al. |
| 7,492,124 B2 | 2/2009 | Johnson et al. |
| 7,504,804 B2 | 3/2009 | Johnson et al. |
| 7,508,167 B2 | 3/2009 | Meyer et al. |
| 7,554,290 B2 | 6/2009 | Johnson et al. |

(Continued)

FOREIGN PATENT DOCUMENTS

| | | | |
|---|---|---|---|
| CN | 217749758 U | * | 11/2022 |
| EP | 2602064 B1 | | 2/2019 |

(Continued)

OTHER PUBLICATIONS

Screenshot of Milwaukee M12 Battery; https://www.milwaukeetool.com/products/batteries-and-chargers/m12-batteries-and-chargers; 5 pages.

(Continued)

*Primary Examiner* — Vivek K Shirsat
(74) *Attorney, Agent, or Firm* — Thrive IP

(57) ABSTRACT

A soldering tool includes an orientation sensor to interrupt power in a non-upright condition and a touch sensor to override the orientation sensor to allow a user to employ the tool in non-upright positions.

20 Claims, 4 Drawing Sheets

(56) References Cited

U.S. PATENT DOCUMENTS

| | | |
|---|---|---|
| 7,557,535 B2 | 7/2009 | Johnson et al. |
| 7,589,500 B2 | 9/2009 | Johnson et al. |
| 7,667,437 B2 | 2/2010 | Johnson et al. |
| 7,714,538 B2 | 5/2010 | Johnson et al. |
| 7,791,318 B2 | 9/2010 | Johnson et al. |
| 7,941,865 B2 | 5/2011 | Seman, Jr. et al. |
| 7,944,173 B2 | 5/2011 | Johnson et al. |
| 7,944,181 B2 | 5/2011 | Johnson et al. |
| 7,952,326 B2 | 5/2011 | Johnson et al. |
| 7,999,510 B2 | 8/2011 | Johnson et al. |
| 8,018,198 B2 | 9/2011 | Meyer et al. |
| 8,154,249 B2 | 4/2012 | Johnson et al. |
| 8,207,702 B2 | 6/2012 | Johnson et al. |
| 8,228,036 B2 | 7/2012 | Meyer |
| 8,269,459 B2 | 9/2012 | Johnson et al. |
| 8,436,584 B2 | 5/2013 | Johnson et al. |
| 8,450,971 B2 | 5/2013 | Johnson et al. |
| 8,471,532 B2 | 6/2013 | Johnson et al. |
| 8,653,790 B2 | 2/2014 | Johnson et al. |
| 8,890,468 B2 | 11/2014 | Bauer |
| D718,705 S | 12/2014 | Naksen |
| 9,041,322 B2 | 5/2015 | Shimizu et al. |
| 9,379,569 B2 | 6/2016 | Johnson et al. |
| 9,746,860 B2 | 8/2017 | Sakaue et al. |
| 10,027,078 B2 | 7/2018 | Knight |
| 10,276,844 B2 | 4/2019 | Wackwitz et al. |
| 10,300,591 B2 | 5/2019 | Rejman et al. |
| 10,553,843 B2 | 2/2020 | Reese et al. |
| 10,688,644 B2 | 6/2020 | Iida et al. |
| 10,727,007 B2 | 7/2020 | Xu et al. |
| 10,827,655 B2 | 11/2020 | Truettner et al. |
| 10,972,041 B2 | 4/2021 | White et al. |
| 11,031,728 B2 | 6/2021 | Louis et al. |
| 11,062,859 B1 | 7/2021 | Jordan et al. |
| 11,114,878 B2 | 9/2021 | Hansen et al. |
| 11,133,662 B2 | 9/2021 | Friedman et al. |
| 11,145,929 B2 | 10/2021 | Altenburger |
| 11,179,787 B2 | 11/2021 | Yoshida et al. |
| 11,251,623 B2 | 2/2022 | Kohler et al. |
| 11,331,783 B2 | 5/2022 | Tanaka et al. |
| 11,465,268 B2 | 10/2022 | Zhu et al. |
| 11,495,929 B1 | 11/2022 | Murray |
| 11,523,510 B2 | 12/2022 | Silha et al. |
| 11,540,429 B2 | 12/2022 | Silha et al. |
| D978,786 S | 2/2023 | Osmola et al. |
| 11,837,694 B2 | 12/2023 | Johnson et al. |
| D1,013,634 S | 2/2024 | Cagle |
| 2006/0112570 A1 | 6/2006 | Serdynski et al. |
| 2007/0279000 A1 | 12/2007 | Lucero |
| 2012/0048588 A1 | 3/2012 | Iyoda et al. |
| 2018/0090964 A1 | 3/2018 | Williams |
| 2018/0198292 A1 | 7/2018 | Lee et al. |
| 2018/0311807 A1 | 11/2018 | Sergyeyenko et al. |
| 2022/0344952 A1 | 10/2022 | Siverhus et al. |
| 2023/0283091 A1 | 9/2023 | Olsson et al. |
| 2023/0291049 A1 | 9/2023 | Varipatis et al. |
| 2023/0402857 A1 | 12/2023 | Robinson et al. |
| 2023/0405792 A1 | 12/2023 | Cox et al. |
| 2024/0006700 A1 | 1/2024 | Fassbender et al. |
| 2024/0022096 A1 | 1/2024 | Hegemann |
| 2024/0106052 A1 | 3/2024 | Nishikawa |
| 2024/0146082 A1 | 5/2024 | Downes |
| 2024/0170739 A1 | 5/2024 | Fauteux et al. |
| 2024/0234907 A1 | 7/2024 | Panosian et al. |
| 2024/0234910 A1 | 7/2024 | Panosian et al. |
| 2024/0234911 A1 | 7/2024 | Panosian et al. |
| 2024/0347286 A1 | 10/2024 | Abbott et al. |

FOREIGN PATENT DOCUMENTS

| | | |
|---|---|---|
| EP | 3517251 B1 | 6/2022 |
| EP | 2554335 B1 | 3/2023 |
| EP | 3476267 B1 | 7/2023 |
| EP | 4144484 B1 | 5/2024 |
| EP | 4410490 A1 | 8/2024 |
| EP | 4438235 A1 | 10/2024 |
| EP | 4438236 A1 | 10/2024 |
| WO | 2017189786 A1 | 11/2017 |
| WO | 2022128874 A1 | 6/2022 |
| WO | 2022172776 A1 | 8/2022 |
| WO | 2023102164 A1 | 6/2023 |
| WO | 2023232138 A1 | 12/2023 |
| WO | 2023244518 A1 | 12/2023 |

OTHER PUBLICATIONS

Screenshot of Milwaukee M18 Battery; https://www.milwaukeetool.com/Innovations/solutions?system=mx-fuel; 7 pages.

Screenshot of Dewalt 12V Max; https://www.dewalt.com/systems/cordless-platforms/12v; 5 pages.

Seenshot of Dewalt 20V Max https://www.dewalt.com/products/accessories/batteries-chargers/batteries; 10 pages.

* cited by examiner

SOLDERING TOOL WITH ORIENTATION SAFETY CONTROL

This utility patent application claims benefit of U.S. Provisional Patent Application Ser. No. 63/419,555 filed in the United States Patent and Trademark Office on Oct. 26, 2022, which is incorporated in its entirety by reference thereto.

BACKGROUND OF THE DISCLOSURE

Soldering tools that can be turned on and remain powered with an active soldering tip—even when not in use—can tip over and create hazardous situations, such as burns or a fire. Soldering tools with "hold to run" triggers require one hand to activate soldering tips on such tools, but these do not permit hands-free soldering in situations or circumstances that require both hands, e.g., one for maneuvering an item being soldered and one for holding and applying solder.

What is needed in the industry is a soldering tool that may be powered and remain on to free both hands for soldering but if tipped over, the soldering tool should shut off to minimize hazardous situations. Furthermore, the needed soldering tool should be usable in non-upright orientations when held by the grip.

BRIEF SUMMARY OF THE DISCLOSURE

The present disclosure is directed in general to a soldering tool that may be electrically powered and left on to free both hands of an operator for soldering. But if the soldering tool is tipped over, power will be disrupted, and the tool will shut off. Moreover, the soldering tool is usable in non-upright orientations when the operator holds a grip of the soldering tool. For instance, the soldering tool may include an orientation sensor that permits the tool to operate in an upright position but shuts it off when moved away from the upright position. Further, a touch sensor in a handle area of the soldering tool will override the orientation sensor when a hand is holding the grip so that the soldering tool can be used in any orientation. Essentially, power can be applied to the soldering tool in a stationary upright position and used for hands-free soldering applications, but if the soldering tool deviates from the upright position, such as being tipped over, the tool automatically shuts off. On the other hand, if the soldering tool is moved away from the upright position by the operator, the touch sensor will override the orientation sensor to permit the operator to use the soldering tool in any orientation.

In an exemplary embodiment, a soldering tool may include a heating element; a soldering tip in communication with the heating element; a power supply configured to power the heating element; a microcontroller in electrical communication with the power supply and the heating element; a vertical orientation sensor in electrical communication with the microcontroller, the vertical orientation sensor being configured to interrupt the power supply to the heating element when a non-upright position is sensed by the vertical orientation sensor, and a grip sensor configured to override the vertical orientation sensor in the non-upright position when a user is gripping the grip sensor, which may be located on a housing of the soldering tool. Further, the power supply may be a rechargeable or disposable battery and/or it may utilize electrical power. Lights such as LEDs may be provided to alert the user to a power condition or setting.

In another embodiment according to the disclosure, a soldering tool may include a housing; a heating element disposed in the housing; a soldering tip depending from housing in communication with the heating element; a power supply removably disposed proximate the housing and configured to power the heating element; a microcontroller disposed in the housing, the microcontroller being in electrical communication with the power supply and the heating element; an orientation sensor disposed in the housing, the orientation sensor being in electrical communication with the microcontroller and being configured to alert the microcontroller of a non-upright position to cause an interruption to the power supply to the heating element; and a grip sensor disposed proximate the housing configured for a user to grip and override the orientation sensor in the non-upright position to maintain power to the heating element and heat to the soldering tip. In yet another aspect of the disclosure, a hold-to-run trigger may be provided for the user to press and activate the grip sensor to override the orientation sensor.

The power supply of the soldering tool may be a rechargeable and/or removable battery. More particularly, the soldering tool may include a receiver, also referred to herein as a cradle, connected to the housing to receive and hold the power supply. The power supply may further include a port to receive an electrical charging cord or cable to recharge the power supply while it remains connected to the soldering tool.

The soldering tool may further include an indicator panel arranged on the housing to alert the user to a condition of the soldering tool, such as power on-off or temperature of the soldering tip.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof directed to one of ordinary skill in the art, is set forth in the specification, which refers to the appended figures, wherein.

DETAILED DESCRIPTION OF THE DISCLOSURE

Figure 1:
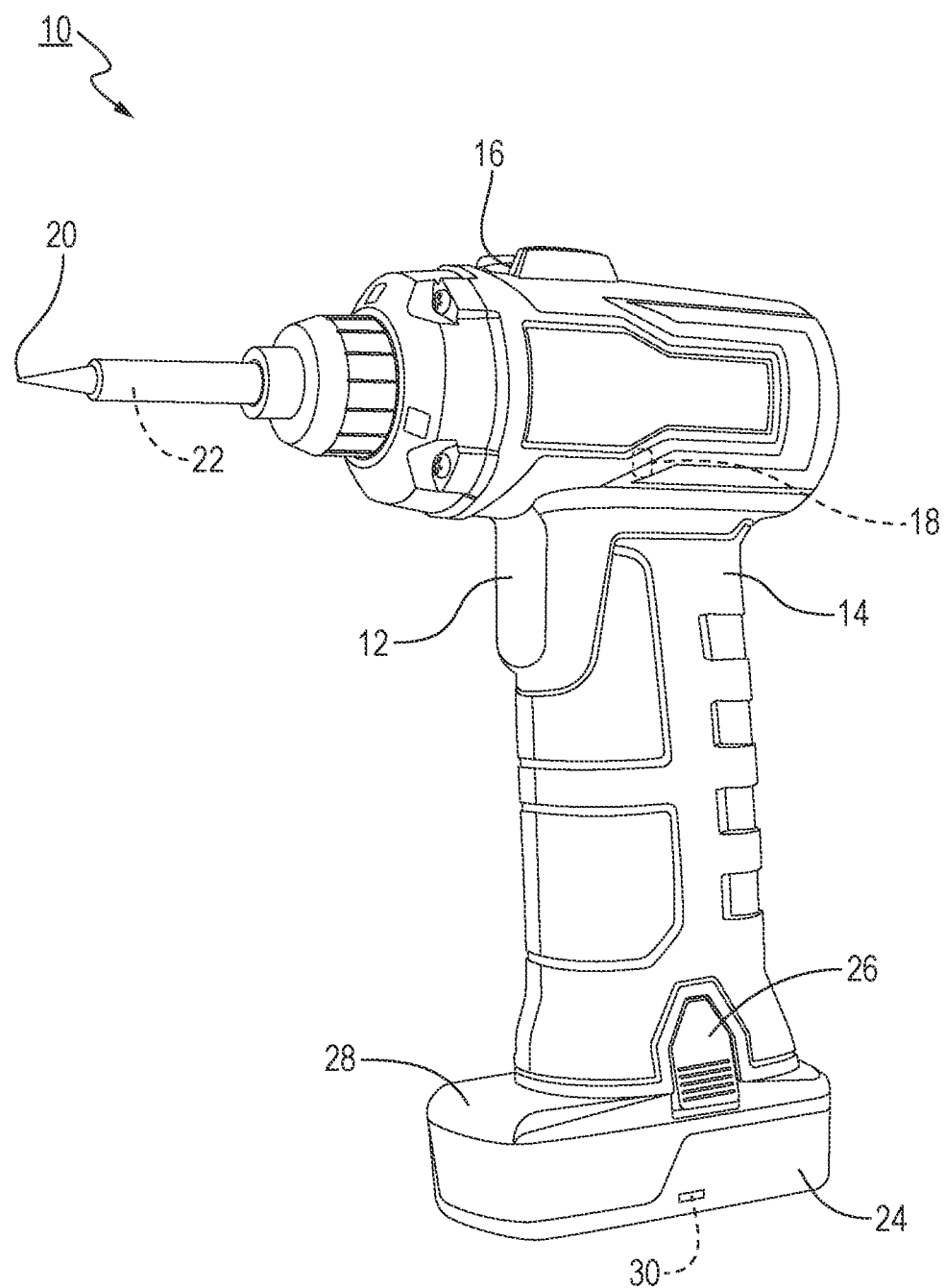
FIG. 1 is a left-side perspective view of a soldering tool according to an aspect of the disclosure.

As required, detailed embodiments are disclosed herein; however, the disclosed embodiments are merely exemplary and may be embodied in various forms. Therefore, specific structural and functional details disclosed herein are not to be interpreted as limiting, but merely as a basis for the claims and as a representative basis for teaching one skilled in the art to variously employ the exemplary embodiments of the present disclosure, as well as their equivalents.

Unless defined otherwise, all technical and scientific terms used herein have the same meaning as is commonly understood by one of ordinary skill in the art to which this disclosure belongs. In the event that there is a plurality of definitions for a term or acronym herein, those in this section prevail unless stated otherwise.

Wherever the phrase "for example," "such as," "including," and the like are used herein, the phrase "and without limitation" is understood to follow unless explicitly stated otherwise. Similarly, "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises," "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, et cetera. Thus, for example, "a device having components a, b, and c" means that the device includes at least components a, b, and c. Similarly, the phrase "a method involving steps a, b, and c" means that the method includes at least steps a, b, and c.

Where a list of alternative component terms is used, e.g., "a structure such as 'a', 'b', 'c', 'd' or the like", or 'a' or 'b'," such lists and alternative terms provide meaning and context unless indicated otherwise.

Unless the context clearly requires otherwise, throughout the description and the claims, the words "comprise," "comprising," and the like are to be construed in an inclusive sense as opposed to an exclusive or exhaustive sense; in the sense of "including, but not limited to."

The various embodiments of the disclosure and/or equivalents falling within the scope of present disclosure overcome or ameliorate at least one of the disadvantages of the prior art or provide a useful alternative.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. The drawings are not necessarily to scale, and some features may be exaggerated to show details of particular components. Thus, the examples set forth in the drawings and detailed descriptions are provided by way of explanation only and are not meant as limitations of the disclosure. The present subject matter thus includes any modifications and variations of the following examples as come within the scope of the appended claims and their equivalents.

Figure 2:
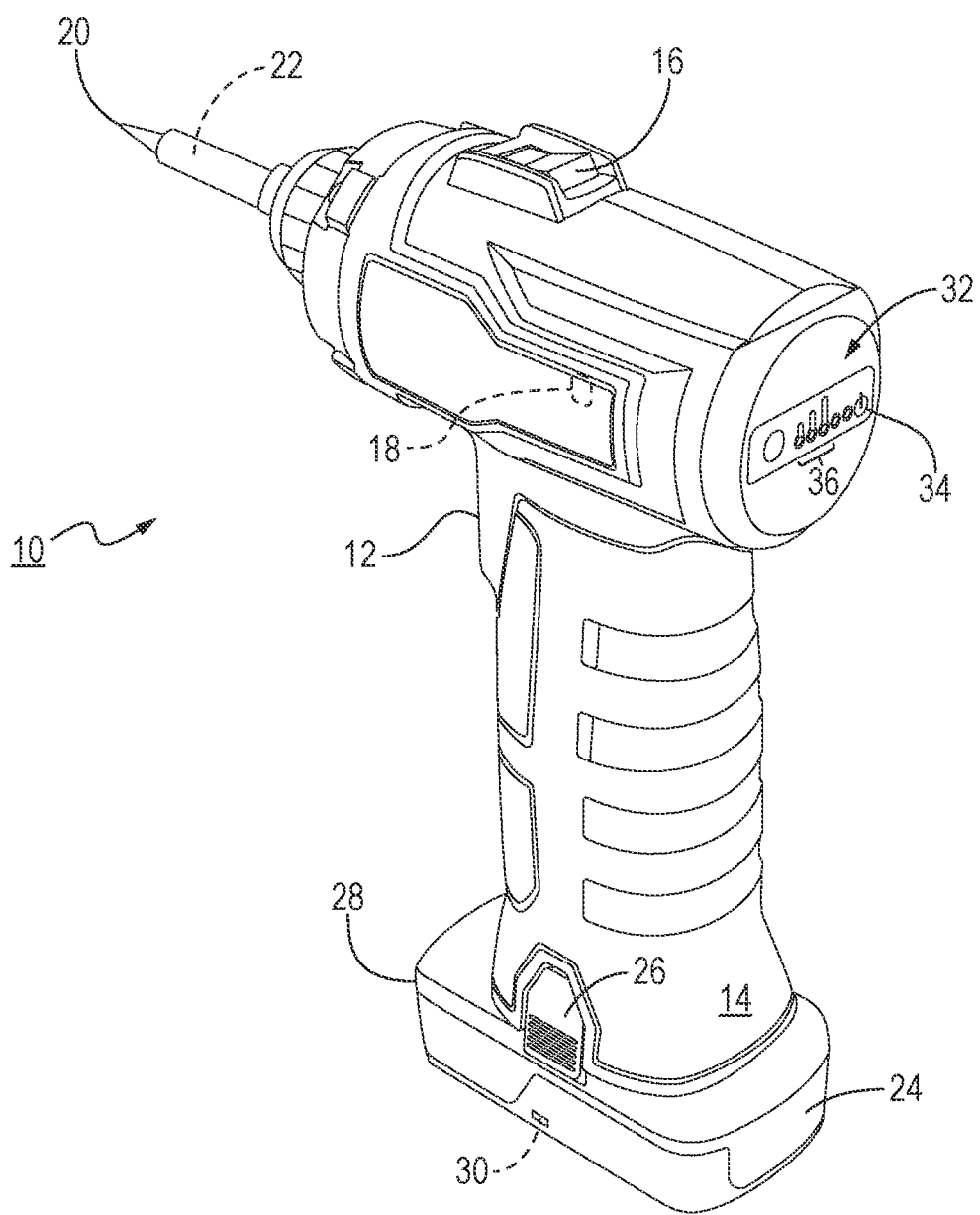
FIG. 2 is rear perspective view of the soldering tool as in FIG. 1.

Turning now to FIGS. 1 and 2, an embodiment of a hands-free soldering tool according to the disclosure is broadly designated by element number 10. The soldering tool 10 generally includes a grip or touch sensor 12, also referred to herein as a "hold-to-run" trigger, located on or around a housing, grip, or handle 14, a power or on-off switch 16, an internal orientation sensor system 18, a soldering tip 20 powered by a heating element 22, and a battery or other power supply 24 detachably connected to the housing 14 using a release mechanism or button 26. More particularly, the battery 24 may be connected to a battery cradle or receiver 28, and, when released, the battery 24 can be replaced with another battery 24. Additionally or alternatively, the battery 24 may include a charging port 30 to recharge the battery 24 using a recharging cord, cable, or docking station (not shown) or for wireless charging, e.g., via a charging surface (not shown) without removing the battery 24 from the cradle 28.

FIG. 2 also shows an indicator panel 32. Various indicator lights may be included on the panel 32 to provide visual alerts to a user regarding the status of the soldering tool 10, e.g., active power 34 or a temperature 36 of the tip 20.

Figure 3:
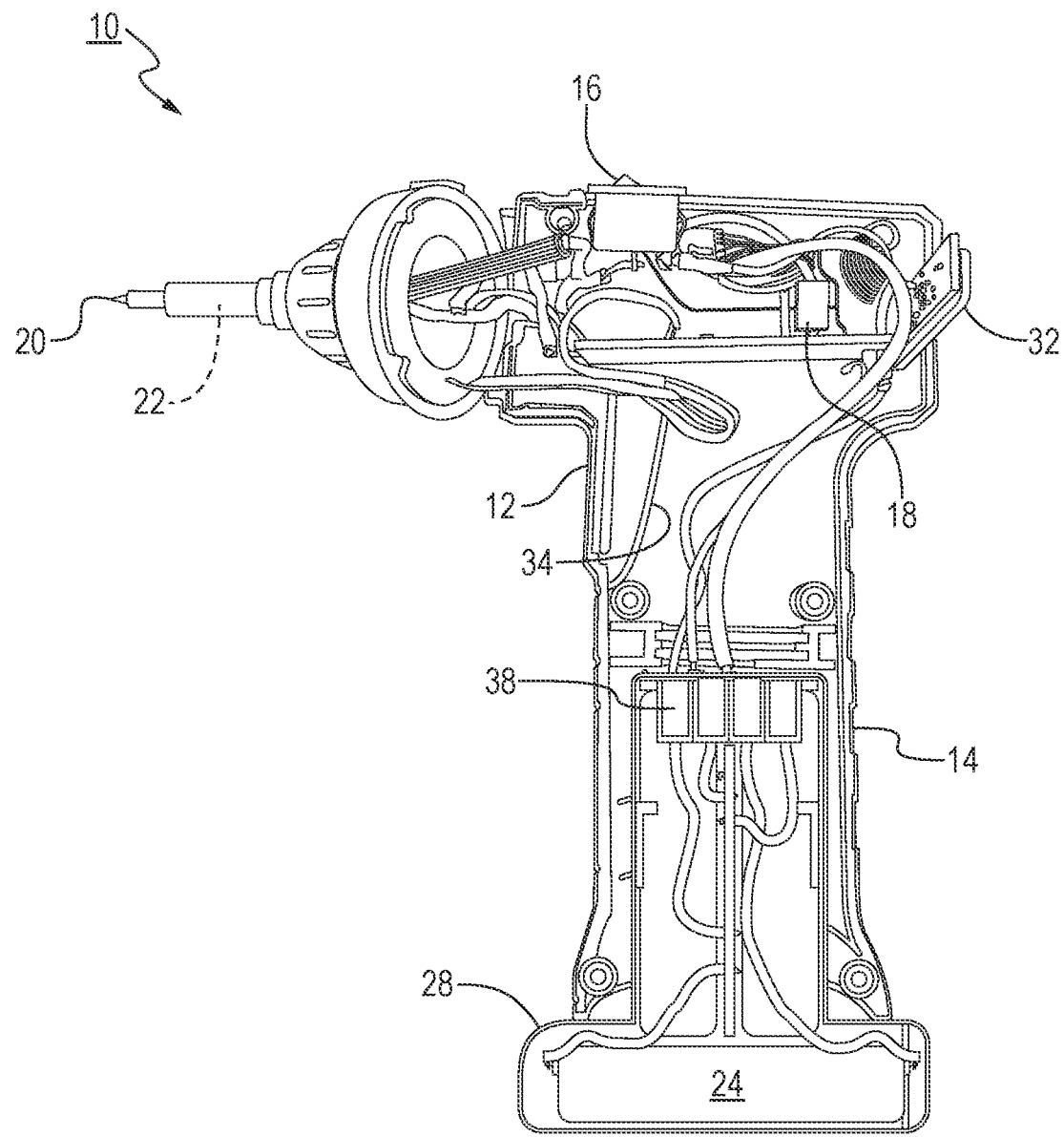
FIG. 3 is a left-side perspective view of the soldering tool as in FIG. 1 with a cover removed to reveal internal components of the soldering tool.

FIG. 3 is a detailed internal view of various components of the soldering tool 10 shown in a partially disassembled state. Here, the power switch 16 introduced above is connected or wired to the battery 24, which, when powered on, supplies power to the heating element 22 in communication with the soldering tip 20 to apply heat to melt solder material (not shown), e.g., tin lead or bar, ribbon, or wire solder.

Also shown in FIG. 3, the vertical orientation sensor 18 and a microcontroller unit (MCU) 38 are in communication between the on-off switch 16 and the battery 24 such that if the soldering tool 10 is moved or displaced from an upright position, the power from the battery 24 will be interrupted by the microcontroller 38 when an incorrect orientation signal is received from the orientation sensor 18. However, if a user (not shown) is gripping the grip sensor 12, the grip sensor 12 will override the orientation sensor 18, i.e., "hold-to-run" and maintain power to the heating element 22 and to the tip 20 so that the user can utilize the soldering tool 10 in non-upright positions. More specifically, the non-upright position may be a tilted position as measured from at least one degree from an upright or vertical orientation of the housing 14 relative to level ground, and the grip sensor 12 may include or be a trigger that can be pressed by the user to override the orientation sensor 18 when the housing 14 is thus tilted.

FIG. 3 further shows the circuit board and indicator panel 32 for task light LEDs and LED status indicators 34, 36 (see FIG. 2). The indicator lights 34, 36 will alert the user about status of the soldering tool 10, such as its orientation, power, tip temperature, and the like.

Figure 4:
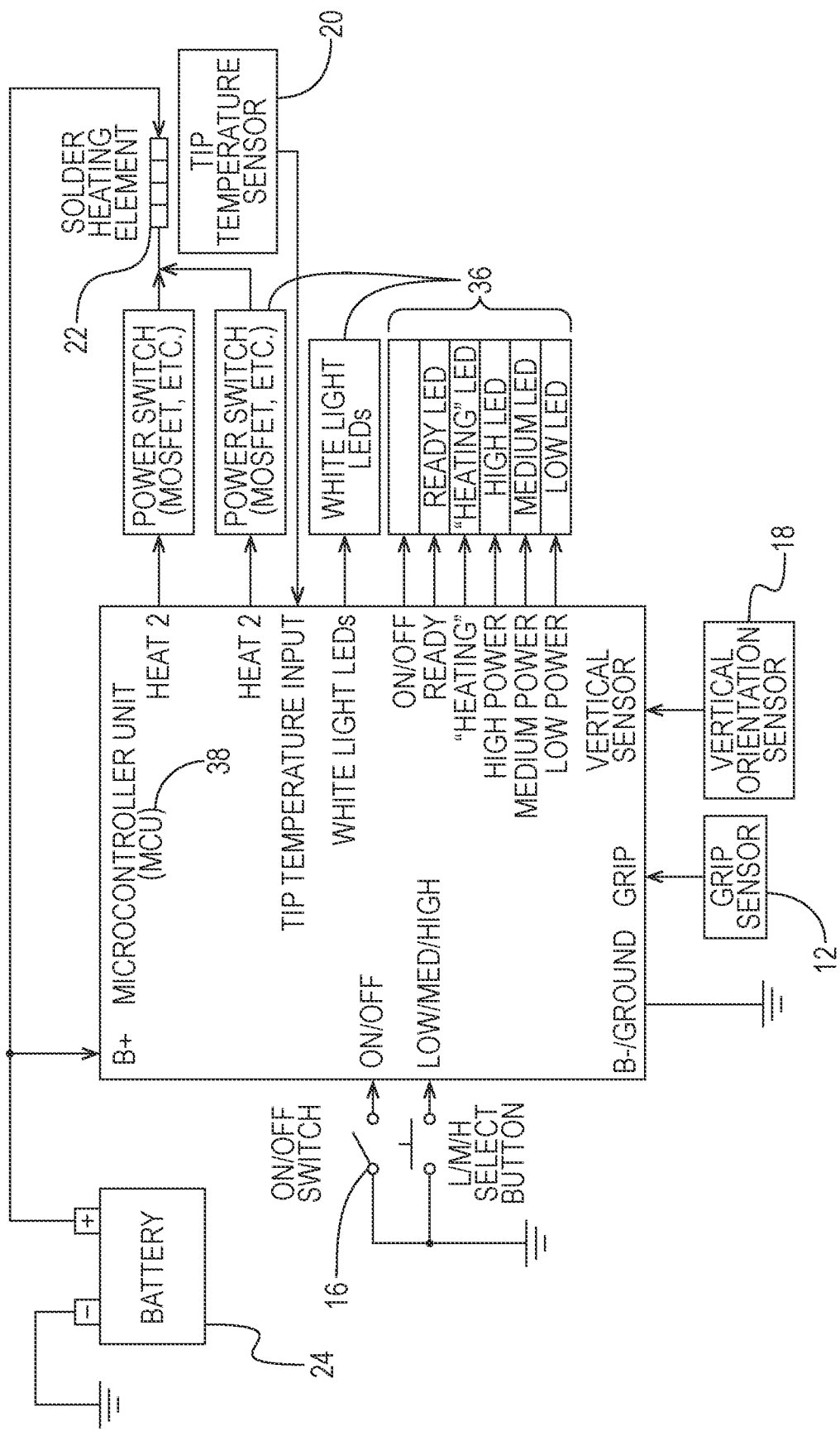
FIG. 4 is an electrical diagram showing an interoperation of components of the soldering tool as in FIG. 1.

With reference to FIG. 4, the wiring diagram shows an electrical interrelationship of various components of the soldering tool 10 introduced above (see. e.g., FIG. 3), such as the touch sensor 12, the power switch 16, the orientation sensor system 18, the soldering tip 20, the heating element 22, the battery 24, indicator lights 36, and the microcontroller 38.

The following TABLE 1 depicts an exemplary operational sequence wherein the foregoing features are controlled by MCU software loaded in the microcontroller 38, although changes in the sequence can be made.

TABLE 1

If ON/OFF switch is turned ON
   Turn on the ON/OFF Status LED
   Turn on white LEDs for operator work light
   Default to Low Power mode on startup
   Pressing the L/M/H button allows selection of Low, Medium or High Power mode
     Turn on the LOW, MEDIUM or HIGH LED based on the user selection
If the Grip Sensor is ON, OR the Vertical Orientation Sensor is ON . . .
   Turn on the Heating Element, using the amount of power selected (Heat 1, Heat 2 or both)
   Monitor the Tip Temperature Sensor - choose values for n1 and n2 for optimum performance
     If Tip Temperature > Selected Temp + n1 degrees
       Reduce power in heating element
       Turn ON "Ready" LED, turn OFF "Heating" LED
     If Tip Temperature < Selected Temp − n2 degrees
       Increase power in Heating Element
       Turn OFF "Ready" LED, turn ON 'Heating' LED
If ON/OFF switch is turned OFF
   Turn OFF Heating Element, LED status Indicators
   After a pre-determined time delay, turn OFF the White Light LEDs and power OFF the MCU Board By way of example and not of limitation, various embodiments according to the disclosure may include:

Embodiment 1

A soldering tool comprising a heating element; a soldering tip in communication with the heating element; a power supply configured to power the heating element; a microcontroller in electrical communication with the power supply and the heating element; a vertical orientation sensor in electrical communication with the microcontroller, the vertical orientation sensor being configured to interrupt the power supply to the heating element when a non-upright position is sensed by the vertical orientation sensor, and a grip sensor configured to override the vertical orientation sensor in the non-upright position when a user is gripping the grip sensor.

Embodiment 2

The soldering tool as in Embodiment 1, wherein the power supply is a battery, the battery being removable and rechargeable.

Embodiment 3

The soldering tool as in Embodiments 1 or 2, further comprising an indicator, preferably an LED, in electrical communication with the battery and the microcontroller to alert the user to a power condition or a temperature condition.

Embodiment 4

A soldering tool comprising a housing; a heating element disposed in the housing; a soldering tip depending from housing in communication with the heating element; a power supply removably disposed proximate the housing and configured to power the heating element; a microcontroller disposed in the housing, the microcontroller being in electrical communication with the power supply and the heating element; an orientation sensor disposed in the housing, the orientation sensor being in electrical communication with the microcontroller and being configured to alert the microcontroller of a non-upright position to cause an interruption to the power supply to the heating element; and a grip sensor disposed proximate the housing configured for a user to grip and override the orientation sensor in the non-upright position to maintain power to the heating element and heat to the soldering tip.

Embodiment 5

The soldering tool as in Embodiment 4, wherein the power supply is a rechargeable battery or is a removable battery.

Embodiment 6

The soldering tool as in Embodiments 4 or 5, wherein the power supply includes a port configured for receiving an electrical charging cord to recharge the power supply.

Embodiment 7

The soldering tool as in Embodiments 4 through 6, further comprising a cradle connected to the housing to receive the power supply.

Embodiment 8

The soldering tool as in Embodiments 4 through 7, further comprising an indicator panel disposed proximate the housing to alert the user to a condition of the soldering tool.

Embodiment 9

The soldering tool Embodiments 4 through 8, wherein the indicator panel includes a plurality of lights to respectively indicate a plurality of conditions, the plurality of conditions including power and temperature.

Embodiment 10

A soldering tool, comprising a housing; a heating element disposed in the housing; a soldering tip depending from the housing in communication with the heating element; a power supply removably disposed proximate the housing and configured to power the heating element; a microcontroller disposed in the housing, the microcontroller being in electrical communication with the power supply and the heating element; an orientation sensor disposed in the housing, the orientation sensor being in electrical communication with the microcontroller and being configured to alert the microcontroller of a tilted position of the housing to cause an interruption to the power supply to the heating element; and a hold-to-run trigger disposed proximate the housing configured for a user to override the orientation sensor in the tilted position to maintain power to the heating element and heat to the soldering tip.

Embodiment 11

The soldering tool as in Embodiment 10, wherein the power supply is a battery.

Embodiment 12

The soldering tool as in Embodiments 10 or 11, wherein the power supply includes a port configured for receiving an electrical charging cord to recharge the power supply.

Embodiment 13

The soldering tool as in Embodiments 10, 11, or 12, wherein the hold-to-run sensor is movably disposed proximate the housing, the hold-to-run trigger being configured for the user to press to override the orientation sensor.

Embodiment 14

The soldering tool as in any one of Embodiments 10 through 13, wherein the tilted position of the housing is at least one degree from a vertical position.

Embodiment 15

The soldering tool as in any one of Embodiments 10 through 14, further comprising an indicator panel disposed proximate the housing to alert the user to a condition of the soldering tool.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A soldering tool, comprising:
   a heating element;
   a soldering tip in communication with the heating element;
   a power supply configured to power the heating element;
   a microcontroller in electrical communication with the power supply and the heating element;
   a vertical orientation sensor in electrical communication with the microcontroller, the vertical orientation sensor being configured to alert the microcontroller of a non-upright position to cause an interruption to the power supply to the heating element; and
   a grip sensor configured to override the vertical orientation sensor in the non-upright position when a user is gripping the grip sensor to maintain power to the heating element and heat to the soldering tip.

2. The soldering tool as in claim 1, wherein the power supply is a rechargeable battery.

3. The soldering tool as in claim 1, wherein the power supply is a removable battery.

4. The soldering tool as in claim 1, further comprising a cradle configured to receive the power supply, the power supply having a port configured for recharging the power supply.

5. The soldering tool as in claim 1, further comprising an indicator in electrical communication with the battery and the microcontroller to alert the user to a power condition or to a temperature condition.

6. The soldering tool as in claim 1, further comprising a housing, the grip sensor being disposed proximate the housing.

7. A soldering tool, comprising:
   a housing;
   a heating element disposed in the housing;
   a soldering tip depending from the housing in communication with the heating element;
   a power supply removably disposed proximate the housing and configured to power the heating element;
   a microcontroller disposed in the housing, the microcontroller being in electrical communication with the power supply and the heating element;
   an orientation sensor disposed in the housing, the orientation sensor being in electrical communication with the microcontroller and being configured to alert the microcontroller of a non-upright position to cause an interruption to the power supply to the heating element; and
   a grip sensor disposed proximate the housing configured for a user to grip and override the orientation sensor in the non-upright position to maintain power to the heating element and heat to the soldering tip.

8. The soldering tool as in claim 7, wherein the power supply is a rechargeable battery.

9. The soldering tool as in claim 7, wherein the power supply is a removable battery.

10. The soldering tool as in claim 7, wherein the power supply includes a port configured for receiving an electrical charging cord to recharge the power supply.

11. The soldering tool as in claim 7, further comprising a cradle connected to the housing to receive the power supply.

12. The soldering tool as in claim 7, further comprising an indicator panel disposed proximate the housing to alert the user to a condition of the soldering tool.

13. The soldering tool as in claim 12, wherein the indicator panel includes a plurality of lights to respectively indicate a plurality of conditions.

14. The soldering tool as in claim 13, wherein the plurality of conditions include power and temperature.

15. A soldering tool, comprising:
   a housing;
   a heating element disposed in the housing;
   a soldering tip depending from the housing in communication with the heating element;
   a power supply removably disposed proximate the housing and configured to power the heating element;
   a microcontroller disposed in the housing, the microcontroller being in electrical communication with the power supply and the heating element;
   an orientation sensor disposed in the housing, the orientation sensor being in electrical communication with the microcontroller and being configured to alert the microcontroller of a tilted position of the housing to cause an interruption to the power supply to the heating element; and
   a hold-to-run trigger disposed proximate the housing configured for a user to override the orientation sensor in the tilted position to maintain power to the heating element and heat to the soldering tip.

16. The soldering tool as in claim 15, wherein the power supply is a battery.

17. The soldering tool as in claim 15, wherein the power supply includes a port configured for receiving an electrical charging cord to recharge the power supply.

18. The soldering tool as in claim 15, wherein the hold-to-run trigger is movably disposed proximate the housing, the hold-to-run trigger being configured for the user to press to override the orientation sensor.

19. The soldering tool as in claim 15, wherein the tilted position of the housing is at least one degree from a vertical position.

20. The soldering tool as in claim 15, further comprising an indicator panel disposed proximate the housing to alert the user to a condition of the soldering tool.

\* \* \* \* \*